US005311597A

United States Patent [19]

Rosenbaum

[11] Patent Number: 5,311,597

[45] Date of Patent: May 10, 1994

[54] DEFERRED OPTICAL CHARACTER RECOGNITION ACTIVE PIGEON HOLE SORTING OF MAIL PIECES

[75] Inventor: Walter S. Rosenbaum, Paris, France

[73] Assignee: International Business Machines Corporation, Armonk, N.Y.

[21] Appl. No.: 944,559

[22] Filed: Sep. 11, 1992

[51] Int. Cl.[5] .................. G06K 9/00

[52] U.S. Cl. .................. 382/1; 259/584; 259/900

[58] Field of Search .................. 382/1, 9, 7, 57; 259/584, 546, 547, 900; 364/478; 235/462

[56] References Cited

U.S. PATENT DOCUMENTS

| | | | |
|---|---|---|---|
| 4,632,252 | 12/1986 | Haruki et al. | 382/1 |
| 4,641,347 | 2/1987 | Clark et al. | 382/1 |
| 4,641,753 | 2/1987 | Tamada | 382/1 |
| 4,965,829 | 10/1990 | Lemelson | 382/1 |
| 4,998,626 | 3/1991 | Ota | 209/586 |
| 5,025,475 | 6/1991 | Okabe | 382/1 |
| 5,031,223 | 7/1991 | Rosenbaum et al. | 382/1 |

*Primary Examiner*—Joseph Mancuso
*Attorney, Agent, or Firm*—John E. Hoel

[57] ABSTRACT

A data processing method and system are disclosed to provide active pigeon hole sorting for mail pieces in a postal system. The method is based upon the receipt of deferred optical character recognition statistics for mail pieces in transit to a destination postal region. An ordered list of addressees is compiled from the DOCR statistics. From this ordered list, the sorting case for sorting the mail is partitioned to eliminate pigeon holes for those postal recipients not receiving mail on that day. Still further, the pigeon holes in the sorting case are actively indicated with a prompting light to facilitate the operator physically sorting the mail piece down to delivery sequence. The assignment of delivery stops to pigeon holes is also developed so as to designate adjacent pigeon holes based on the carrier walk without regard to street number but rather to reflect geographic juxtaposition.

12 Claims, 5 Drawing Sheets

*FIG. 6A*

| | | | |
|---|---|---|---|
| MAIN 1 | MAIN 3 | ALPHA 1 | ALPHA 3 |
| ALPHA 4 | ALPHA 6 | ALPHA 7 | MAIN 4 |
| MAIN 6 | BRAVO 1 | BRAVO 3 | BRAVO 4 |
| BRAVO 6 | BRAVO 7 | MAIN 7 | MAIN 9 |

FIRST SORT
INTO BOX

*FIG. 6B*

| | | | |
|---|---|---|---|
| CHARLIE 1 | CHARLIE 3 | CHARLIE 4 | CHARLIE 6 |
| CHARLIE 7 | MAIN 10 | MAIN 12 | DELTA 1 |
| DELTA 3 | DELTA 4 | DELTA 6 | DELTA 7 |
| MAIN 13 | MAIN 15 | FOXT 1 | FOXT 3 |

SECOND SORT
INTO BOX

46TH

*FIG. 6C*

| | | | |
|---|---|---|---|
| FOXT 4 | FOXT 6 | FOXT 7 | MAIN 16 |
| MAIN 18 | GOLF 1 | GOLF 3 | GOLF 4 |
| GOLF 6 | GOLF 7 | MAIN 19 | MAIN 21 |
| HOTEL 1 | HOTEL 3 | HOTEL 4 | HOTEL 6 |

THIRD SORT
INTO BOX

69TH HOUSE

*FIG. 6D*

| | | | |
|---|---|---|---|
| HOTEL 7 | MAIN 22 | MAIN 23 | MAIN 24 |
| | | | |
| | | | |
| | | | |

DEFERRED OPTICAL CHARACTER RECOGNITION ACTIVE PIGEON HOLE SORTING OF MAIL PIECES

BACKGROUND OF THE INVENTION

1. Technical Field

The invention disclosed broadly relates to automated mail processing and more particularly relates to a method and apparatus for low-cost, flexible sorting of mail pieces, flats and parcels to meet any sort scheme in particular postman delivery walk sequencing. The invention provides greatly improved operational efficiency, while reducing cost and error rate.

2. Background Information

U.S. Pat. No. 5,031,223 entitled "System and Method for Deferred Processing of OCR Scanned Mail" by Walter S. Rosenbaum, et al., assigned to the IBM Corporation and incorporated herein by reference, describes the compilation of statistics indicating the volume of mail pieces directed to particular addressees and destination postal regions. The Rosenbaum, et al. patent describes that such statistics may be used to allocate postal resources at particular destination postal regions to accommodate large volume mail directed to particular addressees.

Copending U.S. patent application Ser. No. 07/748,983, filed Aug. 22, 1991, by Walter S. Rosenbaum entitled "Data Processing System for Optimized Mail Piece Sorting and Mapping to Carrier Walk Sequence Using Real Time Statistical Data," assigned to the IBM Corporation and incorporated herein by reference. This patent application describes an improved means for optimizing the sorting of mail at a destination postal region and the mapping of the mail down to carrier walk sequence, based upon the anticipated pattern of mail volumes to the recipients in that destination region.

In recent years, the volume and necessity for automatic sortation of the mail has risen in order to be competitive with the other types of services that mail pieces could be delivered, such as facsimile or private courier. With the addition of the possibility of privatization of mail service there is an increasing need for methods of sortation of mail which have a different level of economy of scale. It becomes all the more possible worldwide and particularly in Europe that automation of mail will have to be done from all levels, including from the first outbound sort through the successive levels of inbound sort that include sortation to post office carrier to parts of the carrier's walk and then to the actual sequencing of mail within that walk as well as to the boxes of an apartment house that is part of the carrier's walk. The need to automatically perform this for post offices of varying sizes and carrier walks of varying densities and the possibility that this would be pursued by privatized organizations that have a much smaller domain, requires new methods of automatic sortation of the mail. To date, automatic sortation of the mail, once it has been encoded by an intelligent front end, such as an OCR machine or a code desk, has been by virtue of machines called bar code sorters. These have been available for approximately the last 30 years and are driven by reading the bar code on the mail piece and then putting it on a track which is then deflected into either a bin or a stacker. Such machines are produced by numerous companies worldwide including AEG, NEC, Elsag and National Presort. They all have in common that they are highly electrical mechanical, take up a great deal of floor space and very expensive.

OBJECTS OF THE INVENTION

It is therefore an object of this invention to provide an improved method of automatic sortation of the mail once encoded that is an improvement in the state-of-the-art in terms of its economies of scale, the amount of floor space required, its ease of use and above all, a much lower cost.

SUMMARY OF THE INVENTION

In Active Pigeon Hole (APH) sorting a standard "carrier case" referred to as pigeon holes is modified to completely automate the process of reading address data and mapping each envelope into its correct pigeon hole. The physical manipulation of the mail pieces into the slots is left to the human operator. In net, APH sortation productivity is increased by a nominal factor of four by eliminating almost all operator think time. The APH process to be described is analogous to the successful automation of "supermarket check-out" using UPC bar code scanning.

APH, as shown in FIG. 5, is accomplished by giving each mail sorting operator a bar code reader/stacker at their desk. As each letter is removed from the stacker, its bar coded ID is read. A light is flashed under the appropriate pigeon hole (right side of of FIG. 3). The operator does not look at or read any address data.

The bar coded ID previously assigned by DOCR provides the link to the envelope s address data. The optimal pigeon hole to delivery stop assignment, which for example would delete addresses with no mail being delivered that day, is computed during the DOCR travel time between sort center and delivery post office. Similarly the pigeon hole assignment can be ordered to allow delivery sorting where the juxtaposition of delivery stops does not follow the street number order such as is common in Europe where odd and even addresses may be blocks apart. Similar, non-contiguous assignment of pigeon holes would accommodate the occurrence of a cul-de-sac of a street.

APH is applicable to any of the sortation steps for which pigeon holes are normally used. However, in particular, its automation value is most pronounced when applied to the postman's delivery sequence sort step. This step tends to be most time consuming and error prone. It requires the greatest level of training and cognition. Using analysis performed by the Danish Post Office, about 25% of sorting costs are incurred in manually performing the postman deli\ ery walk sequencing operation. In any of the other postal sortation steps, APH also provides productivity gains by allowing use of minimally untrained, low cost labor. Alternatively APH insulates the level of customer service from absenteeism.

In summary Active Pigeon Holes use human dexterity for handling small non-uniform shaped objects (letter/flats/small parcels) and defers to the computer the repetitive, memory intensive step of reading (and re-reading) addresses and then mentally mapping the address data to the correct slot/bin. The cost/benefits relationship underlying the APH sorting solution is one way of balancing new postal realities with the goals of managing cost and improving service.

Note: On the right-hand side of FIG. 3 is an even less expensive APH embodiment driven by simply displaying on a CRT the pigeon hole number for the mail piece currently being sorted.

DESCRIPTION OF THE FIGURES

FIG. 5, 6A-D are the mapping of postman walk delivery sort sequence into Active Pigeon Hole spreads.

DISCUSSION OF THE PREFERRED EMBODIMENT

Figure 1:
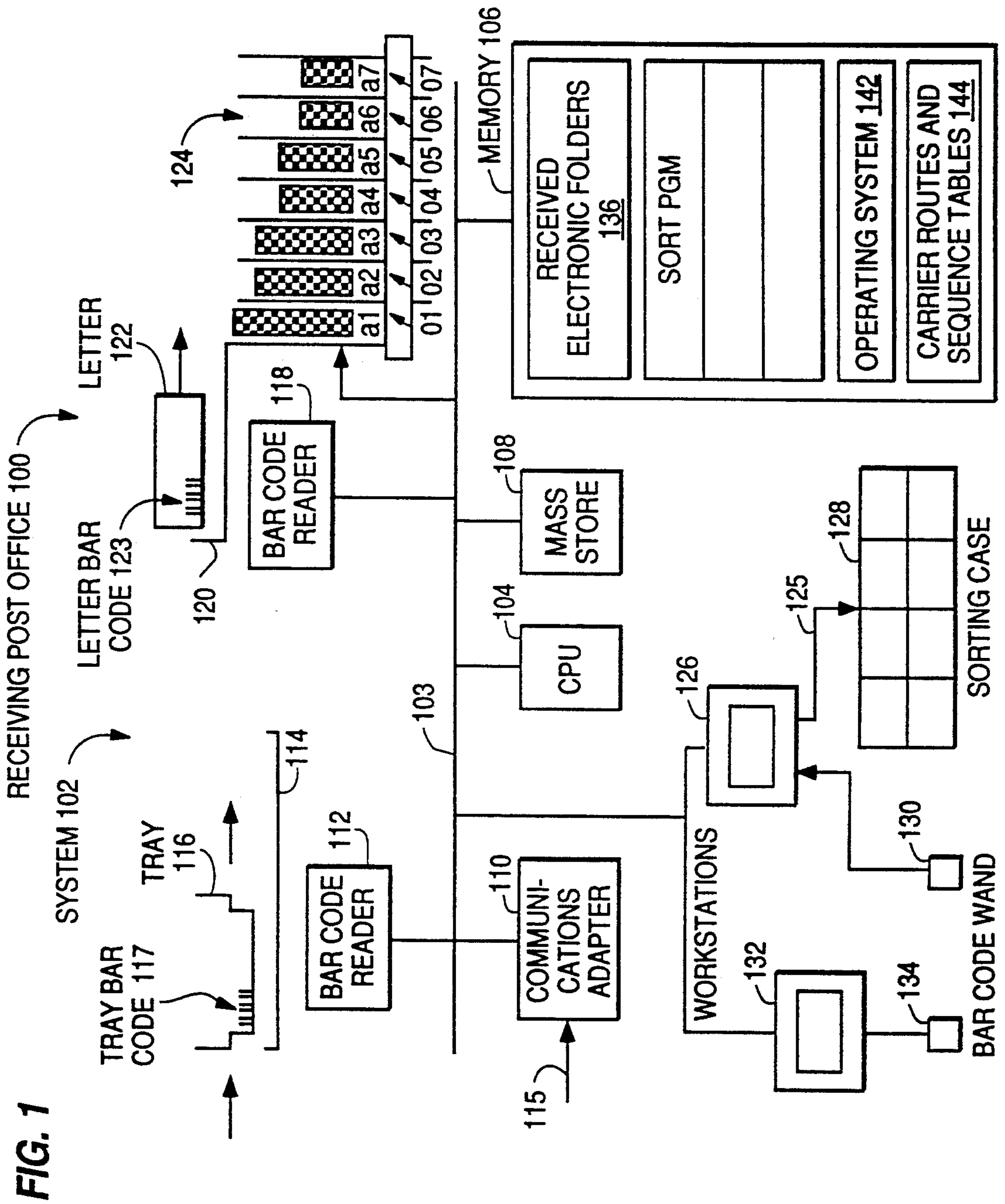
FIG. 1 is a system block diagram of the data processing system at the receiving post office.

This patent application incorporates by reference the copending U.S. patent application Ser. No. 07/748,983, filed Aug. 22, 1991 entitled "Data Processing System for Optimized Mail Piece Sorting and Mapping to Carrier Walk Sequence Using Real Time Statistical Data." by Walter S. Rosenbaum, assigned to the IBM Corporation and incorporated herein by reference.

The patent that was incorporated by reference utilizes the basic idea of having pigeon holes mechanically prompt themselves to an operator either by flashing lights or by bringing up information on the CRT. The way that it was implemented was different than normal pigeon holes. Accordingly in said patent, we scanned every packet of information, not letter. The packets consisted of mail pieces already sorted by customer. We put those in sequentially from left to right, top to bottom, scanning the bar code on each one of them before we put them into the pigeon holes. Then the system went back and computed how we should withdraw them.

The manner in which pigeon holes are normally used is via direct assignment, which means that each pigeon hole has apriori beforehand indicated who it is assigned to. If we were talking about distributing mail in a building, the pigeon holes would actually be the apartment numbers. That means that they are designated before the process begins. The new patent does let you utilize at the pigeon hole in that predefined manner and then scans the bar code at each mail piece and flashes which pigeon hole to put the mail in. It is not as in the previous patent where the prompt relates the sequence of withdrawal of the mail pieces. We are emulating the exact way that pigeon holes are used in the post office. What we are removing is all the cognitive aspect of remembering the assignment to the pigeon holes and then having to physically read the alphanumeric information on the face of the envelope and do in the human mind the mapping to pigeon holes. This is all done beforehand. An improvement on the embodiment of this invention would amount to us utilizing the travel time between the mail pieces from the main sort center to the delivery post offices where the carriers would use this active pigeon hole concept and in that time, we would compute which recipients have mail and only assign pigeon holes to recipients who have mail, thereby incorporating it in every utilization of the 32 pigeon holes nominally that are in a pigeon hole carrier case, the maximum number of delivery end points by removing all of those that do not have mail. This has an important logistic effect of requiring fewer passes over the pigeon holes.

By way of example, assuming we had 320 sorting end points that the carrier delivers mail. Each carrier case that we call a pigeon hole has 32 pockets which have been historically determined by ergonomics, how far a person can reach their arm without straining themselves. That means that to cover 320 locations with a carrier case with 32 pigeon holes, requires 10 passes over the pigeon holes. Operationally this is done by first dividing the mail into 10 separate bundles and then the bundles themselves are distributed into the pigeon holes in 10 separate passes. Each of these passes is called "spreading the mail" over the pigeon hole case. Nominally, one-third of the people receive no mail each day. In the existing operational scenario, those people still have the pigeon hole dedicated to them and just receives no mail when the mail pieces are spread over that pigeon holes. Using active pigeon holes and the travel time between the sortation center and delivery post office, we can compute who has mail that day and accordingly set up the active pigeon holes to reflect only the people who have mail. Using the numbers in the example, if we had 320 recipients, nominally 120 may not receive mail on a given day, leaving 200 people who would be receiving mail. Instead of making 10 passes of the pigeon holes, we would now make approximately six to seven passes of the pigeon holes, which represent a major saving in labor/time. Additionally, since we now handle the pigeon hole mapping of mail pieces analogous to how we have with UPC codes automated grocery shopping, the ringing up of the tab for grocery shopping, on top of the reduction in the number of passes through the pigeon holes, we receive a major increment of a factor of perhaps three improvement in the speed with which the mail pieces are mapped to the pigeon holes. This also has the advantage of decreasing the error rate in hand sorting of mail pieces and the systemic error pattern of occasionally putting the mail piece below or above the correct pigeon hole instead of into it. Accordingly we make a major reduction in error rate that is normally about a five percent missort rate.

The first pass through pigeon holes breaks the mail into bundles that are "spread over" a pigeon hole, which means that we segment the clients or end points that a carrier services, into groupings of 32. Then we have to divide the mail in a macro sense to those groupings of 32 and then in a micro sense, we then go back and "spread it" in the micro sense into individually assigned pigeon holes.

A reasonable way of breaking this out would be to geographically partition that 32 pigeon holes represents the first 32 stops on a carrier's walk and then the next spread of 32 pigeon holes represents the next 32 stops. What we would then do is first group the mail by the first 32 stops on a carrier's walk, then we make another grouping of the next 32, Grouping 1 is then spread or allocated specifically to the pigeon holes. When that's completed, the mail is withdrawn, put in a tray in the order of its being withdraw and the pigeon holes are now mentally redefined by the carrier to the next set of numbers 33-64 and continuing on until all stops are handled. This becomes extremely complex in Europe where odd and even numbers are not necessarily across the street from one another and another aspect of this invention allows us to do a geographic mapping of the physical numbers so that the mail is put into the boxes not only just for the people who have mail that day, but in the sequence that the addresses occur in the walk of the carrier and reflecting in the geographic juxtaposition. It is common in Europe for odd and even numbers to not be across the street from each other or anywhere within several blocks.

In this example, we have a city, let's say Copenhagen, whose geographic districts are hypothetically divided up into 10 areas. The number of districts for the pass sorting is arbitrary. This number of districts could, for example, be the number of carriers, it could be the number of subsidiary post offices or other suitable first pass division partition.

A pile of mail for the entire city of Copenhagen sits before a reading device so that as each piece of mail is sequentially pulled from the pile, it is passed by the reading device where the deferred optical character recognition (DOCR) bar code number is read, or alternately, where a local sorting bar code number is read.

Prior to the initial first pass sorting, a first pass partition definition is loaded into the system which defines the 10 partitions for Copenhagen delivery post office 1. Next as each mail piece is pulled from the pile and read by the reader, the system accesses the corresponding electronic mail piece folder, using the DOCR number.

Next the mail piece is assigned to one of 10 pigeon hole locations. The next step is to assign one of the partitions to the mail piece. The next step is to light a light or highlight a display, that is to display a prompt to the operator indicating which of several bins or pigeon holes this particular mail piece is to be manually sorted to. These bins are holding bins for the next level of sorting.

Each level of sorting has a greater definition to it leading to a final mapping to the end point which is for example carrier walk sequence. The next step is that the operator manually puts the mail piece into the particular bin or pigeon hole whose indicator light is illuminated. Then the steps loop back to drawing another mail piece from the pile and reading the DOCR ID bar code on the envelope.

After all of the mail pieces in the pile have been manually sorted into for example 10 bins, the next pass in this example, the second pass is performed. As many additional passes are done until the sorting level is down to individual delivery locations. A part of this invention is the elimination of those recipients in a geographic area who are not receiving mail on a particular day. There will be no pigeon hole box designated for a recipient that is not receiving mail on a particular day. This information will be known after a first pass. In fact, this information is known from the DOCR statistics which are accumulated prior to the time that the physical mail pieces arrive by truck to the destination post office.

Part of the partitioning can include a recognition of non-contiguous geographic recipients having numbers which are close together. An alternate way of saying this is contiguous postal recipients who have numbers that are not numerically close together. Typically this level of partition is accomplished at a late pass where a pass perhaps to a particular geographic block is performed.

Postal recipients can be geographically adjacent to one another but have numerically diverse widely separated addresses. This for example may be for a street whose name changes at an intersection so that persons on the first side of the intersection have a first street name and a series of street numbers, and persons on the opposite side of the intersection of the same physical street have a different street name and still a different set of street numbers. In this example, the system will have stored the recognition that the mail partition at the carrier walk sequence includes this change in street name and change in numbering. However, at the last pass sorting, the pigeon holes can be allocated for the carrier walk sequence of recipients receiving mail that day, notwithstanding the fact that the address is completely different for geographically adjacent recipients.

Another example is the European circumstance where address odd numbers and even numbers are not necessarily immediately across the street from one another. Part of what is stored in the system is a mapping of the carrier walk sequence as a geographic sequence, notwithstanding the actual address number or street name.

Another example which illustrates this is walking into a cul-de-sac where a carrier will be walking down a main street having a first name, he will turn into a cul-de-sac having a second name and will continue walking and delivering mail and then will walk backout on the first street and resume where he left off in the numbering on the main street. This can be handled by the storage of the geographic juxtaposition of addresses in the serial sequence for the carrier walk which will be mapped in the last pass pigeon holes which are located in a 32 pigeon hole box for those recipients who are receiving mail on that day.

Figure 2:
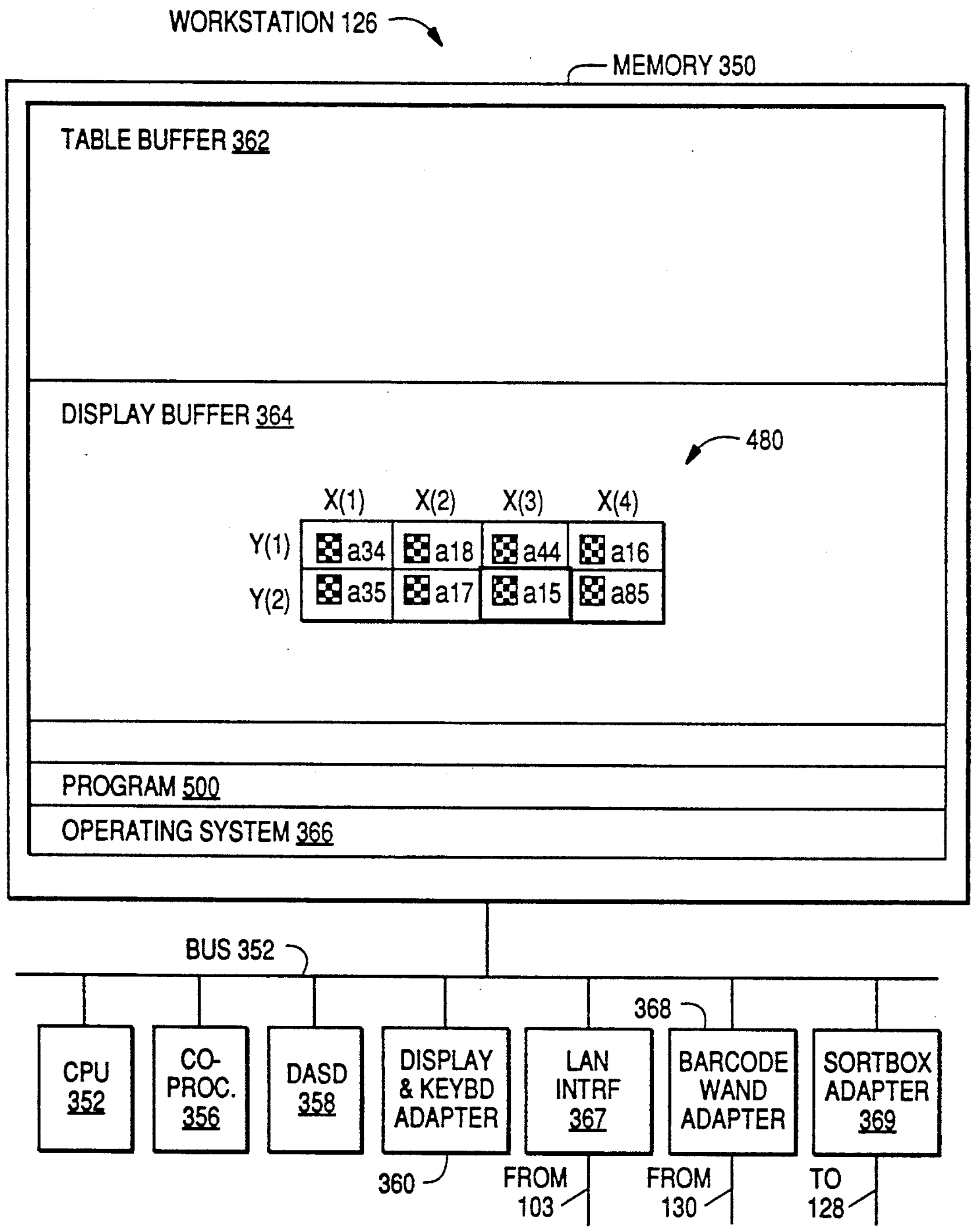
FIG. 2 is a system block diagram of the carrier's workstation 126.

FIG. 1 is an overall system block diagram of the data processing system 102 at the receiving post office 100, to process mail pieces in a optimized manner down to carrier walk sequence. System 102 has the CPU 104 connected by means of the bus 103 to the bar code reader 112, the communications adapter 110, the mass store 108, the bar code reader 118, the sorter apparatus 124, the memory 106, and the workstations 126 and 132. The bar code reader 134 atop stacker 135 is connected to workstation 132 and the bar code reader 130 atop stacker 131 is connected to the workstation 126. The sorting case 128 is connected by connection 125 to the workstation 126. The communications adapter 115 is connected to a data processing network to receive electronic mail piece folders 136 from sending post office 160, 162 and 164, as is shown in FIG. 2. The tray 116 on conveyor 114 passes its bar code 117 by the bar code reader 112. The bar code reader 112 reads the bar code reader 112 reads the bar code 117 on a mail tray 116 carrying mail pieces arriving from destination post offices. Among those mail pieces is the letter 122 which has a bar code 123 which is read by the bar code reader 118 when it passes on the conveyor 112. The sorting apparatus 124 includes the sorting pockets 01' through 07' which serve to receive letters in the mail packets a1 through a7, shown in FIG. 1. The memory 106 includes a partition for storing received electronic folders 136, another partition to store the sorting program. The memory 106 also includes a partition for storing the operating system 142 and a partition 144 for storing the carrier routes and sequence tables.

Figure 3:
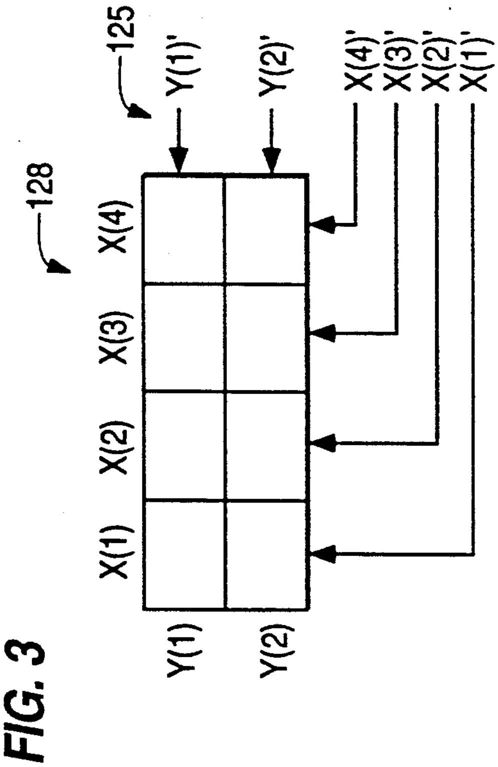
FIG. 3 is a diagram of two alternative modes of Active Piegon Hole carrier case sorting configuration.

FIG. 2 is a system block diagram of a carrier's workstation 126. The workstation includes a bus 352 which interconnects the memory 350 with the CPU 352, an optional co-processor 356, a DASD 358, a keyboard and display adapter 360, a local area network interface 367 which connects the workstation to the bus 103, a bar code wand adapter 368 which is connected to the wand 130, and a sorting case adapter 369 which is connected to the sorting case 128. The memory 350 is partitioned into a table buffer 362 which stores Tables 1, 2 and 3. Another partition in the memory 350 is the display buffer 364 which stores the image 480 of the sorting case 128 with a particular pigeon hole shown highlighted. This image can be displayed on the workstation or it can also be highlighted with appropriate indicators mounted on the sorting box 128, as is shown in FIG. 3. Another partition in the memory 350 stores the operating system program 336. Program 500 is executed by the CPU 352 in the workstation 126.

FIG. 3 shows another view of the sorting case 128 and of the connection 125 to the workstation 126. Each carrier sorts his packets by route segment and he will use the sorting case 128 with its pigeon holes to sort the packets in each route segment. The pigeon holes are identified by x coordinates, x(1) through x(4). and by y coordinates, y(1) to y(2). The wires x(1)' through x(4)' and y(1)' to y(2)' provide a Cartesian coordinate signaling system to enable the illumination of a signal light in any pigeon hole of the sorting case 128 corresponding to a highlighted pigeon hole shown in the image 480 in the display buffer 364 of the workstation 126.

Figure 4:
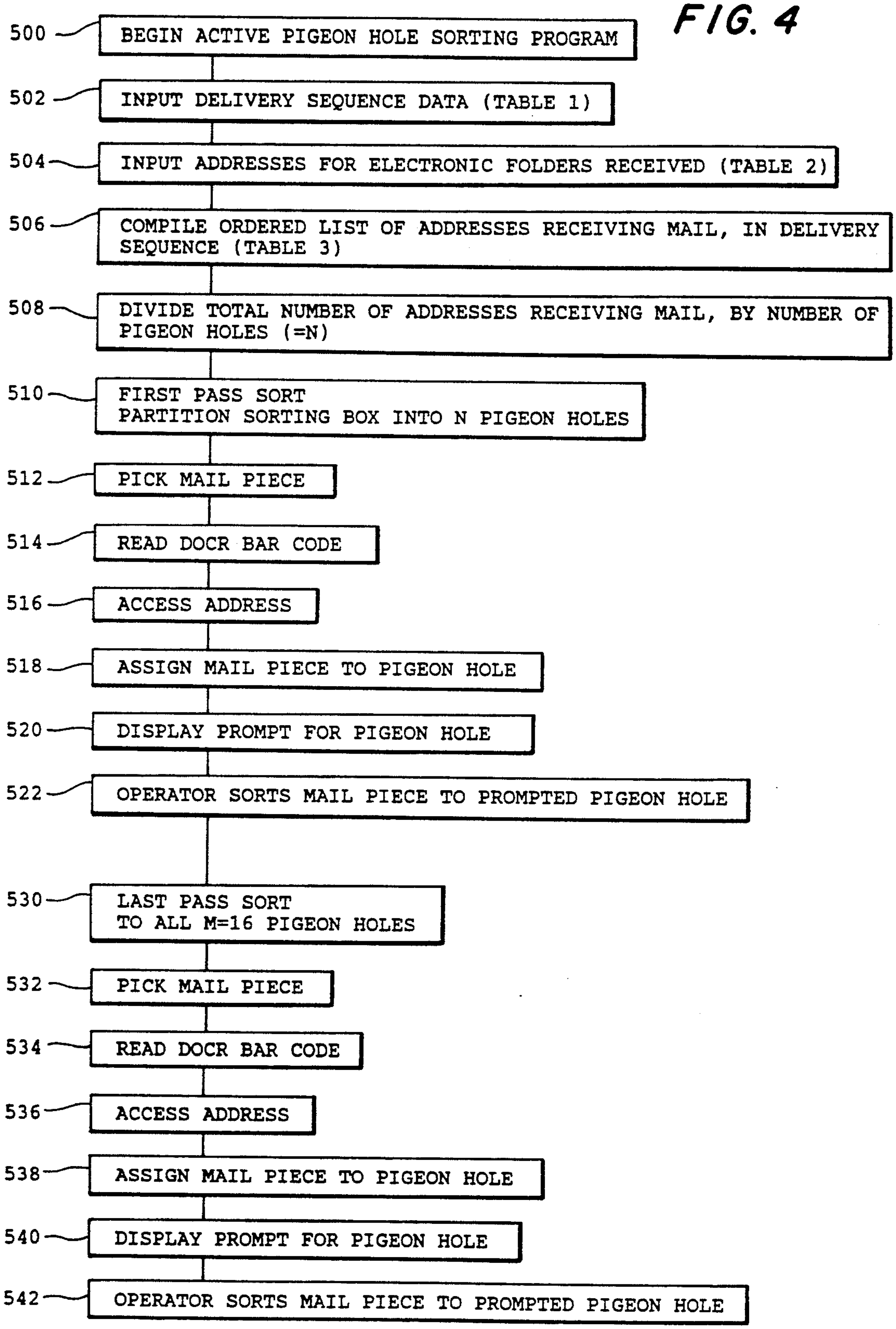
FIG. 4 is a flow diagram of the sequence of operational steps to carry out the active pigeon hole sorting method, in accordance with the invention.

FIG. 4 shows a flow diagram of the sequence of operational steps which are carried out in the CPU 104 of the system of FIG. 1 and in the CPU 352 in the workstation of FIG. 2.

Step 500 begins the active pigeon hole sorting program 500 in FIG. 4. Step 502 inputs the delivery sequence data which is represented by the example in Table 1. Table 1 is a delivery sequence data for the carrier route shown in FIG. 5.

Figure 5:
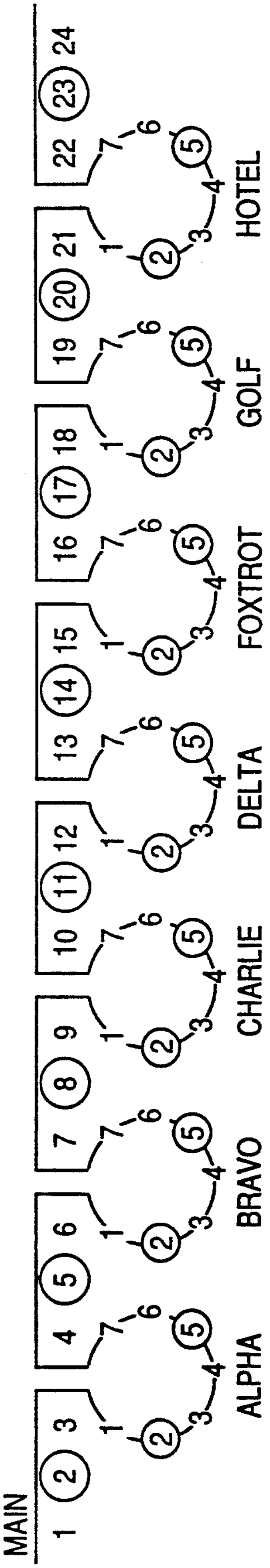

It can be seen in FIG. 5, that Main Street has 24 postal recipient addresses. Also situated along Main Street are seven cul-de-sacs respectively named. Alpha, Bravo, Charlie, Delta, Foxtrot, Golf and Hotel. Each cul-de-sac has seven postal recipients on it. For example, Alpha Street has house numbers 1–7. The delivery sequence file of Table 1 establishes the carrier walk sequence for the postal carrier delivering mail to each respective house along his route which includes Main Street, and Alpha, Bravo, Charlie, Delta, Foxtrot, Golf and Hotel Streets.

Returning now to the flow diagram of FIG. 4, step 504 inputs the addresses for the electronic folders received at the destination post office. This data set is shown in Table 2. Table 2 shows that not all of the postal recipients on the carrier route shown in FIG. 5, have received mail on this particular day. This is typical for residential postal activity, typically one-third of the postal recipients do not receive mail on any particular day. Table 2 lists those postal recipients along the carrier route of FIG. 5, who have received mail on this particular day.

Returning now to FIG. 4, step 506 compiles an ordered list of address es receiving mail, in delivery sequence. This is Table 3. Referring to Table 3, it can be seen that the postal recipient addresses are ordered in the order of the carrier route sequence of Table 1, but only those postal recipients receiving mail on this day are included in Table 3.

Turning now to the flow diagram of FIG. 4, step 508 divides the total number of addressees receiving mail along this carrier route, by the number of pigeon holes in the sorting box shown in FIG. 3. For this example, the sorting box of FIG. 3 is to have 16 pigeon holes. Since an inspection of either Table 2 or Table 3 shows that there are out of the total number of 73 postal recipient addresses on the carrier route of FIG. 5, only 52 of those postal recipients are receiving mail on this example day. Thus 52 divided by the number of pigeon holes are 16 is equal to three and three-sixteenths. This value is rounded up to the next higher integer or four. This value is set equal to the variable N.

Then in step 510 of FIG. 4, a first pass sorting partition is assigned to the sorting box of FIG. 3, to divide the box into N equals four bins. This will enable a first pass sorting of mail pieces. Included in step 510 first pass sorting partition, are steps 512–522. Step 512 picks a mail piece. This typically would be done by the operator picking any one of the mail pieces for the carrier route of FIG. 5. Then step 514 reads the deferred OCR (DOCR) bar code off the front of the mail piece. Instead of the DOCR bar code, there may be a translated local bar code for sorting, occasionally used where convenient. The reading of the bar code can be done by merely passing the mail piece by a stationary bar code reader near or embedded in the stacker holding the pile of mail pieces to be sorted. Alternately, a bar code wand such as the wand 130 in FIG. 1 can be used by the operator to read the bar code where flats or parcels are then sorted into pigeon holes.

Then step 516 of FIG. 4 accesses the address corresponding to the DOCR bar code, from the address mail piece electronic folder which is in partition 136 of memory 106 of FIG. 1. Then in step 518, the mail piece is assigned to one of the four bins in accordance with the ordered list of Table 3, which is an ordered list of addressees receiving mail, in the delivery sequence.

Then, in accordance with the invention, the corresponding pigeon hole for the box 128 is highlighted either by illuminating the box with a light adjacent to the box, or alternately by highlighting a display of the box on the workstation 126, as shown in FIG. 2. The light or highlighting prompts the operator who then in step 522 of FIG. 4, sorts the mail piece to the appropriate and indicated pigeon hole in the box 128.

Then step 522 loops back to step 512 so that all of the mail pieces which are to be received by postal recipients along the carrier walk sequence of FIG. 5, are sorted into four different bins.

Then, second pass sorting, third pass sorting, etc. can be carried out until a last pass sorting stage is achieved, where the mail pieces are sorted by individual postal recipients in the carrier delivery sequence of FIG. 5.

Step 530 of FIG. 4 is the last pass sort of the mail pieces to all 16 pigeon holes in the sorting case 128. Since there are 16 pigeon holes, and since, for the example shown in Tables 1, 2 and 3 there are four groups of sorted mail, the last pass sorting operation 530 will be conducted four times.

The last pass sorting operation 530 of FIG. 4 includes steps 532–542. Step 532–542 are similar to steps 512–522, respectively.

For the last pass sort, all of the pigeon holes in the sorting case 128 are used, even though some of the postal recipients along the delivery route are not receiving mail on this particular day. FIGS. 6A, 6B, 6C and 6D illustrate how this is achieved.

In the last pass sorting for the example of Table 3, FIG. 6A shows the first 16 postal recipients receiving mail on that day, are each allocated one pigeon hole in the box 128. FIG. 6B shows that the next 16 postal recipients are each assigned a pigeon hole and there are no unassigned pigeon holes. FIG. 6C shows the third group of 16 postal recipients receiving mail on this day are each assigned a pigeon hole and there are no unassigned pigeon holes. It should be noted that by the third sorting in FIG. 6C, a total of 69 houses along the postal route will have been services, some of those houses not receiving mail. One of the advantages of the invention can be appreciated by the recognition that if conventional sorting case operations were performed, it would take four stages of sorting into the sorting box 128 to get to the point achieved by three sorting boxes shown in FIGS. 6A, 6B and 6C. This is because the invention is able to compress the sorting of mail to only those persons who receive mail on that day. Then a final sorting box use is shown in FIG. 6D so that the last four postal recipients receiving mail are serviced.

Thus it is seen that the invention enables a more efficient use of postal personnel by removing the necessity for the postal operator to read each letter before selecting a pigeon hole in the sorting case 128. The pigeon hole is automatically selected by the system of the invention. Further, the number of "spreads" of mail into the sorting case 128 is reduced because the invention also eliminates from the sorting case all postal recipients who are not receiving mail on a particular day.

Although a specific embodiment of the invention has been disclosed, it will be understood by those having skill in the art that changes can be made to that specific embodiment without departing from the spirit and the scope of the invention.

TABLE 1

| DELIVERY SEQUENCE | | |
|---|---|---|
| ORDER | STREET | NUMBER |
| 1 | MAIN | 1 |
| 2 | MAIN | 2 |
| 3 | MAIN | 3 |
| 4 | ALPHA | 1 |
| 5 | ALPHA | 2 |
| 6 | ALPHA | 3 |
| 7 | ALPHA | 4 |
| 8 | ALPHA | 5 |
| 9 | ALPHA | 6 |
| 10 | ALPHA | 7 |
| 11 | MAIN | 4 |
| 12 | MAIN | 5 |
| 13 | MAIN | 6 |
| 14 | BRAVO | 1 |
| 15 | BRAVO | 2 |
| 16 | BRAVO | 3 |
| 17 | BRAVO | 4 |
| 18 | BRAVO | 5 |
| 19 | BRAVO | 6 |
| 20 | BRAVO | 7 |
| 21 | MAIN | 7 |
| 22 | MAIN | 8 |
| 23 | MAIN | 9 |
| : | | |
| : | | |

TABLE 2

| ELECTRONIC FOLDERS RECEIVED | |
|---|---|
| STREET | NUMBERS |
| MAIN | 1,3,4,6,7,9,10,12,13,15,16, 18,19,21,22,24 |
| ALPHA | 1,3,4,6,7 |
| BRAVO | 1,3,4,6,7 |
| CHARLIE | 1,3,4,6,7 |
| DELTA | 1,3,4,6,7 |
| FOXTROT | 1,3,4,6,7 |
| GOLF | 1,3,4,6,7 |
| HOTEL | 1,3,4,6,7 |

TABLE 3

| DELIVERY SEQUENCE | |
|---|---|
| STREET | NUMBERS |
| MAIN | 1,3 |
| ALPHA | 1,3,4,6,7 |
| MAIN | 4,6 |
| BRAVO | 1,3,4,6,7 |
| MAIN | 7,9 |
| CHARLIE | 1,3,4,6,7 |
| MAIN | 10,12 |
| DELTA | 1,3,4,6,7 |
| MAIN | 13,15 |
| FOXTROT | 1,3,4,6,7 |
| MAIN | 16,18 |
| GOLF | 1,3,4,6,7 |
| MAIN | 19,21 |
| HOTEL | 1,3,4,6,7 |
| MAIN | 22,24 |

What is claimed is:

1. A data processing method for providing active pigeon hole sorting of mail pieces, comprising:
inputting delivery sequence data;
inputting addressee data for postal recipients receiving mail, in a data base;
compiling an ordered list of addressees receiving mail, in delivery sequence;
partitioning a sorting case for first pass sorting of mail pieces using said ordered list of addresses;
picking a mail piece;
reading a code for the mail piece;
accessing an address from the data base;
assigning the mail piece to a pigeon hole in said sorting case in accordance with said partitioning;
displaying a prompt referring to said pigeon hole in accordance with said partitioning;
sorting the mail piece to said reference to pigeon hole.

2. The method of claim 1 which further comprises:
performing a last pass sort on said mail pieces comprising the steps of:
displaying a prompt referring to the pigeon hole;
sorting the mail piece to the referred to pigeon hole indicated.

3. The method of claim 1 wherein said code is a local sorting bar code.

4. The method of claim 1 wherein said code is a deferred optical character recognition bar code.

5. The method of claim 1 wherein said prompt is displayed adjacent to said pigeon hole.

6. The method of claim 1 wherein said prompt is displayed on a workstation display device.

7. The method of claim 1 wherein said sorting step is followed by performing additional passes on the mail piece.

8. A data processing system for providing active pigeon hole sorting of mail pieces, comprising:
first means for inputting delivery sequence data;
second means for inputting addressee data for postal recipients receiving mail, in a data base;
means coupled to said first and second means, for compiling an ordered list of addressees receiving mail, in delivery sequence;
means coupled to said compiling means, for partitioning a sorting case for first pass sorting of mail pieces using said ordered list of addresses;
means for picking a mail piece;
means for reading a code for the mail piece;

means coupled to said second means, for accessing an address from the data base;

means coupled to said compiling means, for assigning the mail piece to a pigeon hole in said sorting case in accordance with said partitioning;

means coupled to said assigning means, for displaying a prompt referring to said pigeon hole in accordance with said partitioning;

whereby an operator can view the prompt and sort the mail piece to a pigeon hole.

9. The system of claim 8 wherein said code is a local sorting bar code.

10. The system of claim 8 wherein said code is a deferred optical character recognition bar code.

11. The system of claim 8 wherein said prompt is displayed adjacent to said pigeon hole.

12. The system of claim 8 wherein said prompt is displayed on a workstation display device.

* * * * *